United States Patent [19]
Eidson

[11] Patent Number: 6,125,420
[45] Date of Patent: Sep. 26, 2000

[54] MECHANISMS FOR DETERMINING GROUPINGS OF NODES IN A DISTRIBUTED SYSTEM

[75] Inventor: John C. Eidson, Palo Alto, Calif.

[73] Assignee: Agilent Technologies Inc., Palo Alto, Calif.

[21] Appl. No.: 09/439,885

[22] Filed: Nov. 12, 1999

[51] Int. Cl.[7] .................................................. G06F 13/14
[52] U.S. Cl. ........................ 710/242; 710/11; 709/201; 709/220; 709/230
[58] Field of Search ...................... 710/242, 11; 709/201, 709/220, 230

[56] References Cited

U.S. PATENT DOCUMENTS

| | | |
|---|---|---|
| 5,483,535 | 1/1996 | McMillen et al. .................... 370/85.1 |
| 5,548,585 | 8/1996 | Lagoutte et al. ....................... 370/60 |
| 5,687,174 | 11/1997 | Edem et al. ............................ 370/446 |
| 5,995,488 | 11/1999 | Kalkunte et al. ...................... 370/232 |

*Primary Examiner*—Ario Etienne

[57] ABSTRACT

A distributed system with mechanisms and protocols for self-grouping of communication in the distributed system. A distributed system according to the present teachings includes a set of nodes and a set of group hubs that enable communication among the nodes. The group hubs and the nodes engage in a group identification protocol for determining a set of groupings of the nodes which are based on a topology of connections among the group hubs and the nodes. The group hubs include mechanisms for special handling of messages associated with the group identity protocol. The mechanisms and protocols for self-grouping are such that communication addressing is automatically determined by the nodes based on the topology of the distributed system.

15 Claims, 3 Drawing Sheets

MECHANISMS FOR DETERMINING GROUPINGS OF NODES IN A DISTRIBUTED SYSTEM

BACKGROUND OF THE INVENTION

1. Field of Invention

The present invention pertains to the field of distributed systems. More particularly, this invention relates to distributed systems with self-grouping communication.

2. Art Background

Distributed systems commonly include an arrangement of nodes which exchange messages via a communication network. A distributed computer system, for example, typically includes a variety computers connected as nodes on a communication network. A distributed control system, as another example, commonly includes an arrangement of nodes which perform sensor and actuator and application controller functions connected to a communication network.

Each node in a distributed system usually interacts with one or more of the other nodes via the communication network. For example, a particular node may gather data and transfer the data to selected other nodes. In addition, a particular node may perform computations and provide the results of computation to selected other nodes. As a consequence, each of the nodes is usually configured with the appropriate parameters that will enable it to communicate with the appropriate ones of the other nodes in accordance with the overall design of an application.

Prior distributed systems are usually administered systems in which each of the nodes is configured with appropriate parameters that enable communication among the nodes according to the needs of a particular application. For example, a system administrator may manually enter a set of communication parameters into each individual node. Unfortunately, such manual entry operations are usually time consuming and expensive and greatly increases the cost of installing and prior distributed control systems. Morever, such manual configuration is usually required when new components are added to the system, thereby adding to the cost of upgrading and maintaining existing systems.

SUMMARY OF THE INVENTION

A distributed system is disclosed with mechanisms and protocols for self-grouping of communication in the distributed system. A distributed system according to the present teachings includes a set of nodes and a set of group hubs that enable communication among the nodes. The group hubs and the nodes engage in a group identification protocol for determining a set of groupings of the nodes which are based on a topology of connections among the group hubs and the nodes. The group hubs include mechanisms for special handling of messages associated with the group identity protocol. The mechanisms and protocols for self-grouping are such that communication addressing is automatically determined by the nodes based on the topology of the distributed system.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
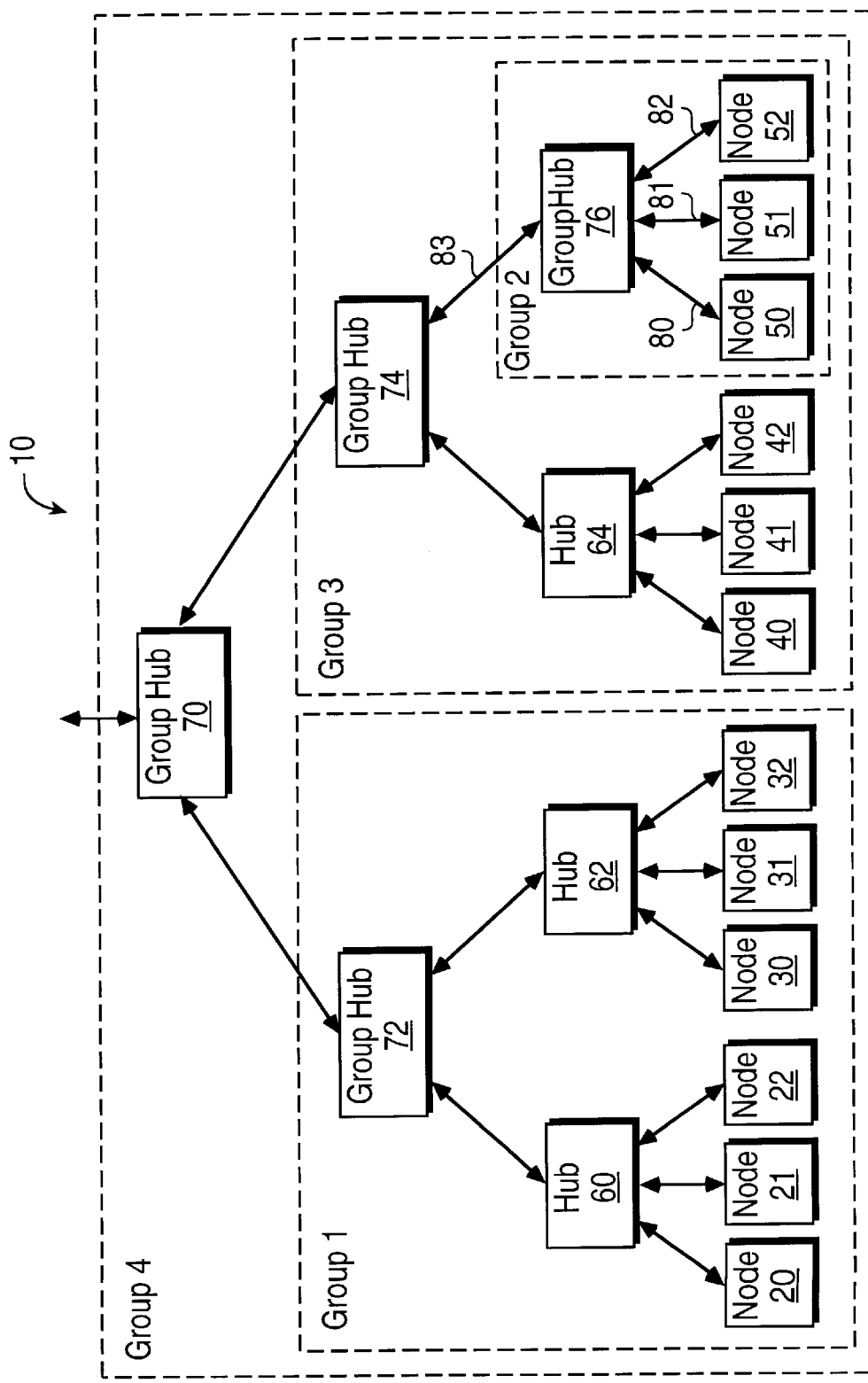
FIG. 1 shows a distributed system according to the present teachings.

FIG. 1 shows a distributed system 10 according to the present teachings. The distributed system 10 includes a set of nodes 20–22, a set of nodes 30–32, a set of nodes 40–42, and a set of nodes 50–52. The nodes 20–22, 30–32, 40–42, and 50–52 are interconnected via a communication network that has a hierarchical arrangement defined by a set of hubs 60–64 and a set of group hubs 70–76.

The nodes 20–22, 30–32, 40–42, and 50–52 may be any type of the nodes associated with a distributed system. For example, any one or more of the nodes 20–22, 30–32, 40–42, and 50–52 may be a computer system, a sensor node having one or more associated sensors, or an actuator node having one or more associated actuators, or an application controller node that performs a control process or a combination of any these types of nodes. Any one or more of the nodes 20–22, 30–32, 40–42, and 50–52 may have embedded processors or may be embodied as a computer system such as a personal computer.

The hubs 60–64 enable communication with subsets of the nodes 20–22, 30–32, 40–42, and 50–52 in a known manner. For example, any one or more of the hubs 60–64 may be a device such as a prior art repeater or a prior art switching hub. The hub 60 enables communication among the nodes 20–22 and enables communication between the nodes 20–22 and the group hub 72. The hub 62 enables communication among the nodes 30–32 and enables communication between the nodes 30–32 and the group hub 72. The hub 64 enables communication among the nodes 40–42 and enables communication between the nodes 40–42 and the group hub 74.

The topology of interconnections among the group hubs 70–76 and the nodes 20–22, 30–32, 40–42, and 50–52 are used to define a set of groupings of the nodes 20–22, 30–32, 40–42, and 50–52. For example, the connections of the nodes 20–22 and 30–32 to the group hub 72 defines a grouping (GROUP 1) of the nodes 20–22 and 30–32. In more general terms, all of the nodes of the distributed system 10 that are lower in the hierarchy than the group hub 72 belong to GROUP 1. Similarly, the connections to the group hub 76 define a grouping of the nodes 50–52 (GROUP 2), the connections to the group hub 74 define a grouping of the nodes 40–42 and 50–52 (GROUP 3), and the connections to the group hub 70 define a grouping of the nodes 20–22, 30–32, 40–42, and 50–52 (GROUP 4).

Although this example shows GROUPS 1–4, it will be appreciated that more groups or fewer groups having different topologies may be implemented in a distributed system by selection of the appropriate number of group hubs and interconnections among the group hubs and the nodes.

The functions of the nodes 20–22, 30–32, 40–42, and 50–52 and their arrangement into GROUPS 1–4 are predetermined according to the needs of a particular application in the distributed system 10. Once the Groups 1–4 are defined, then the nodes 20–22, 30–32, 40–42, and 50–52 and the group hubs 70–76 are connected to form the topology that yields the Groups 1–4. The group hubs 70–76 and the nodes 20–22, 30–32, 40–42, and 50–52 implement a group identity protocol that conveys to each of the nodes 20–22, 30–32, 40–42, and 50–52 the identity of its particular group.

In one embodiment, each of the nodes 20–22, 30–32, 40–42, and 50–52, and each of the group hubs 70–76 generates and transmits a group query message to determine the identity of the group to which it is associated. The group query message may be transmitted at power up of a node or group hub or may be transmitted periodically by a node or group hub or in response to a global broadcast message that causes all nodes and group hubs to re-obtain their group identity.

The hubs 60–62 relay the group query messages to higher levels of the hierarchy of the distributed system 10. For example, the hub 60 relays group query messages from the node 20 onto the group hub 72 and the hub 64 relays group query messages from the node 40 onto the group hub 74.

In contrast, the group hubs 70–76 do not relay the group query messages to higher levels of the hierarchy. Instead, the group hubs 70–76 generate and transmit group identification messages back to the nodes that generated the group query messages. For example, the group hub 72 responds to a group query message from the node 20 by transmitting a group identification message back to the node 20. The hub 60 relays the group identification message onto the nodes 20–22 just like any other message. Similarly, the group hub 76 responds to a group query message from the node 52 by transmitting a group identification message back to the nodes 50–52 and the group hub 74 responds to a group query message from the group hub 76 by transmitting a group identification message sack to the group hub 76.

Alternatively, the group hubs may periodically generate and transmit group identification messages to lower levels of the hierarchy rather than wait for group query messages.

The group hubs 70–76 block transmission of group identification messages received from higher levels of the hierarchy onto lower levels of the hierarchy. For example, the group hub 76 blocks group identification messages received from the group hub 74. Similarly, the group hubs 72 and 74 block group identification messages received from the group hub 70.

The group identification messages generated by the group hubs 70–76 include the appropriate group identifiers. For example, a group identification message from the group hub 76 includes an identifier for GROUP 2 and a group identification message from the group hub 70 includes an identifier for the GROUP 4. The identifiers for GROUPS 1–4 may be derived from a unique identifier associated with each of the group hubs 70–76. For example, the identifier for GROUP 2 which is contained in a group identification message from the group hub 76 may be the Ethernet MAC address for the group hub 76 if the distributed system 10 is implemented with Ethernet communication. Similarly, the identifier for GROUP 4 may be the Ethernet MAC address for the group hub 74.

A group identification message may include identifications of higher level groups. For example, a group identification message from the group hub 76 may include an identifier for GROUP 3 as the parent of GROUP 2 and an identifier for GROUP 4 as the grand parent of GROUP 2. Similarly, a group identification message from the group hub 72 may include an identifier for GROUP 4 as the parent of GROUP 1.

A group identification message may include application-specific information. The application-specific information may be obtained by the group hubs 70–76 using a sensor that is a member of its corresponding group. The sensor may be part of a group hub itself or may be one of the nodes in its group. For example, the application-specific information may be GPS data from an GPS sensor associated with a group. As another example, the application-specific information may be provided by a thumbnail switch or bar code sensor associated with a group hub.

The communication patterns among the nodes 20–22, 30–32, 40–42, and 50–52 are based on their corresponding groupings GROUP 1 through GROUP 4. The topology of the connections among the nodes 20–22, 30–32, 40–42, and 50–52 and the group hubs 70–76 is preselected to yield a set of application-specific communication domains which are derived from the arrangement of GROUP 1 through GROUP 4. The application-specific communication domains may be mapped onto a multi-cast address space in the distributed system 10.

In one embodiment, the application-specific communication domains are mapped onto a multi-cast address space based on a characterization number associated with each of the groups GROUP 1 through GROUP 4. The characterization number of a particular group is a value equal to the maximum number of group hubs between the group hub that defines the particular group and the corresponding nodes. For example, there are no group hubs between the nodes 20–22 and 30–32 of GROUP 1 and their defining group hub 72. This corresponds to a characterization number (CN) equal to zero for GROUP 1. Similarly, CN=0 for GROUP 2. GROUP 3 has a maximum of one group hub, the group hub 76, between its nodes 50–52 and its defining group hub 74 and therefore has a CN=1. GROUP 4 has a maximum of two group hubs, the group hubs 74–76, between its nodes 50–52 and its defining group hub 70 and therefore has a CN=2.

The space of available multi-cast addresses in the distributed system 10 may be subdivided based on the CN values so that each level of the application-specific communication domains has a different set of addresses. For example, if 64 multi-cast addresses are available then one possible division is to assign 21 addresses to each of the CN=0, CN=1, and CN=2 characterizations. The resulting mapping may be as shown in Table 1.

TABLE 1

| GROUP 1 | CN=0 | ADDRESSES 0–20 |
| GROUP 2 | CN=0 | ADDRESSES 0–20 |
| GROUP 3 | CN=1 | ADDRESSES 21–41 |
| GROUP 4 | CN=2 | ADDRESSES 42–62 |

With this mapping, the nodes 20–22 and 30–32 use the multi-cast addresses 0–20 when communicating in GROUP 1, the nodes 50–52 use the multi-cast addresses 0–20 when communicating in GROUP 2, the nodes 40–42 and 50–52 use the multi-cast addresses 21–41 when communicating in GROUP 3, and the nodes 20–22, 30–32, 40–42, and 50–52 use the multi-cast addresses 42–62 when communicating in GROUP 4. Each of the multi-cast address regions my be further subdivided into addresses devoted to application-specific functions such as alarms, control, reporting, and other common functions.

Consider an example application in the distributed system 10 in which the node 50 is an actuator node that implements a control function that accepts a set-point input and one or more sensor inputs. The control system architecture is standardized so that the control loop self-configures by accepting set-points and sensor data that match in units. For example, the node 50 accepts set-points and sensor data having units of pascals that are multi-cast in GROUP 2. The node 51 is a sensor that posts sensor data in units of pascals in the GROUP 2 multi-cast space and the node 52 posts set-point data in units of pascals in the GROUP 2 multi-cast space.

Consider another example application in the distributed system 10 in which the nodes 20–22 form a first temperature control loop, the nodes 30–32 form a first pressure control loop, the nodes 40–42 form a second temperature control loop, and the nodes 50–52 form a second pressure control loop. The first temperature control loop and the first pressure control loop do not interfere with one another even though they use the same GROUP 1 multi-cast address space because they post and consume data in different units. For example, the first temperature control loop may post and consume data in units of degrees celsius and the first pressure control group may post and consume data in units of pascals.

However, the first pressure control loop would interfere with the second pressure control loop because they use the same units and they use the GROUP 1 and the GROUP 2 multi-cast address spaces which are the same. Therefore, each group hub 70–76 is designed to contain all messages having domain addresses that correspond to CN values less than or equal to its CN value to its grouping. Therefore, the group hub 74 having a CN=1 and the group hub 70 having a CN=2 do not pass to higher levels of the hierarchy messages having the GROUP 1 and GROUP 2 addresses 0–20 which are associated with a CN=0.

The mapping of multi-cast address space to application-specific communication domains enables the nodes 20–22, 30–32, 40–42, and 50–52 to determine their appropriate multi-cast addresses from the topology of the distributed system 10 using the group identity protocol without the intervention of an administrator. For example, the node 20 receives a group identification message from the group hub 72 that includes a group identifier for GROUP 1 and a group identifier of its parent group which is GROUP 4. The node 20 uses this information to compute a CN value equal to 0. The node 20 is also encoded with the information in Table 1. The node 20 uses the information from Table 1 to determine that is should use multi-cast addresses 0–20 from communication withing its group. The remaining nodes 21–22, 30–32, 40–42, and 50–52 implement similar functionality.

The properties of the group hubs 70–76 in one embodiment are as follows:

Each group hub 70–76 complies with the repeater specifications for the particular communication protocol used in the distributed system 10. For example, if Ethernet communication is used then each group hub 70–76 complies with the specifications for an Ethernet repeater.

Each group hub 70–76 includes a single top port and one or more bottom ports to establish a hierarchy.

Each group hub 70–76 includes additional hardware and/or code for changing predetermined messages received via its bottom ports so that nodes or hubs reached via its top port do not receive the predetermined messages or do not act on the predetermined messages. An example of such a predetermined message is a group query message.

Each group hub 70–76 includes additional hardware and/or code for changing predetermined messages received via its top port so that nodes or hubs reached via its bottom ports do not receive the predetermined messages or do not act on the predetermined messages. An example of such a predetermined message is a group identification message.

Each group hub 70–76 has a unique communication identifier and participates in the group identify protocol.

A set of additional properties of the group hubs 70–76 in one embodiment are as follows:

Each group hub 70–76 participates in a protocol to obtain an application identifier.

Each group hub 70–76 participates in a protocol to map communication domains onto multi-cast addresses.

Each group hub 70–76 participates in a protocol to define a characterization number for the corresponding group.

Each group hub 70–76 limits the top to bottom and bottom to top propagation of designated multi-cast addresses based on the communication domain mapping which may be based on characterization numbers.

The following description of group hub functionality applies to an embodiment in which the distributed system 10 uses Ethernet communication. A typical Ethernet communication frame includes a preamble, followed by an Ethernet header, an IP header, a UDP header, a payload, and an Ethernet CRC. The preamble is used by a group hub to phase lock an internal clock and regenerate the data stream. The preamble is re-transmitted to all other ports of the group hub before the Ethernet header is received and therefore before it can be determined whether the particular message is one which should not be propagated. In order to prevent other nodes from acting on a message a group hub may corrupt the frame or mark the frame so that receiving nodes will ignore it. Corruption may be performed by generating a collision condition as described in the Ethernet specification or by producing a CRC error. It is preferred that the frame be marked so that it will be ignored as this will prevent network monitoring tools from recording higher than applicable error rates.

The following method of marking a frame so that it will be ignored is based on the context of IP multi-casting. An IP multi-cast address has 4 bytes which are mapped onto a 6 byte Ethernet destination address with the remaining 2 bytes used for IP multi-cast. Within the 4 bytes, one bit is reserved for other purposes which leaves an address space for multi-cast of 01005E000000 to 01005E7FFFFF hex. These are transmitted from left to right by octet and within an octet bitwise from left to right. Assume that the multi-cast address of 01005E01FF00 is used for a group query message. If a group query message is received on a top port of a group hub, then the group hub must prevent it from being processed by nodes reachable via its bottom ports. If a group query message is received on a bottom port of a group hub, then the group hub must prevent it from being processed by nodes reachable via its top port.

The detection of a group query message can be performed by testing the first 63 bits of the destination address of a message. If the pattern 01005E01FF00 is detected then it is know that this is a message to be marked so that receivers will ignore it. The last re-transmitted bit of the destination address is modified to a 1, thereby generating 01005E01FF10 which indicates to receiving nodes and group hubs that the messages is to be ignored. Similar methods may be used to mark group identification messages which are not to be acted upon.

This technique may also be used by a group hub to selectively relay messages based on CN values. For example, a pair of multi-cast addresses 01005EX0FF00 and 01005EX0FF10 may be used where X is the CN value of the sender. The detection process is similar to that outlined above but rather than a pure match the detection has a "greater than" aspect in the portion of the address that holds X. The detection is performed by testing the first 63 bits of the destination address field. The last bit is modified to a 0 or 1 depending on the port on which the message is received and the CN comparison. For example, if marking as a 1 indicates to receivers that they should discard the message then if the message was being received on a bottom port of a group hub and the CN comparison indicates that the message should not be passed on, the message to the top port of the group hub is marked but the messages to the other bottom ports are unmarked with appropriate CRCs generated for messages to the top and bottom ports.

Figure 2:
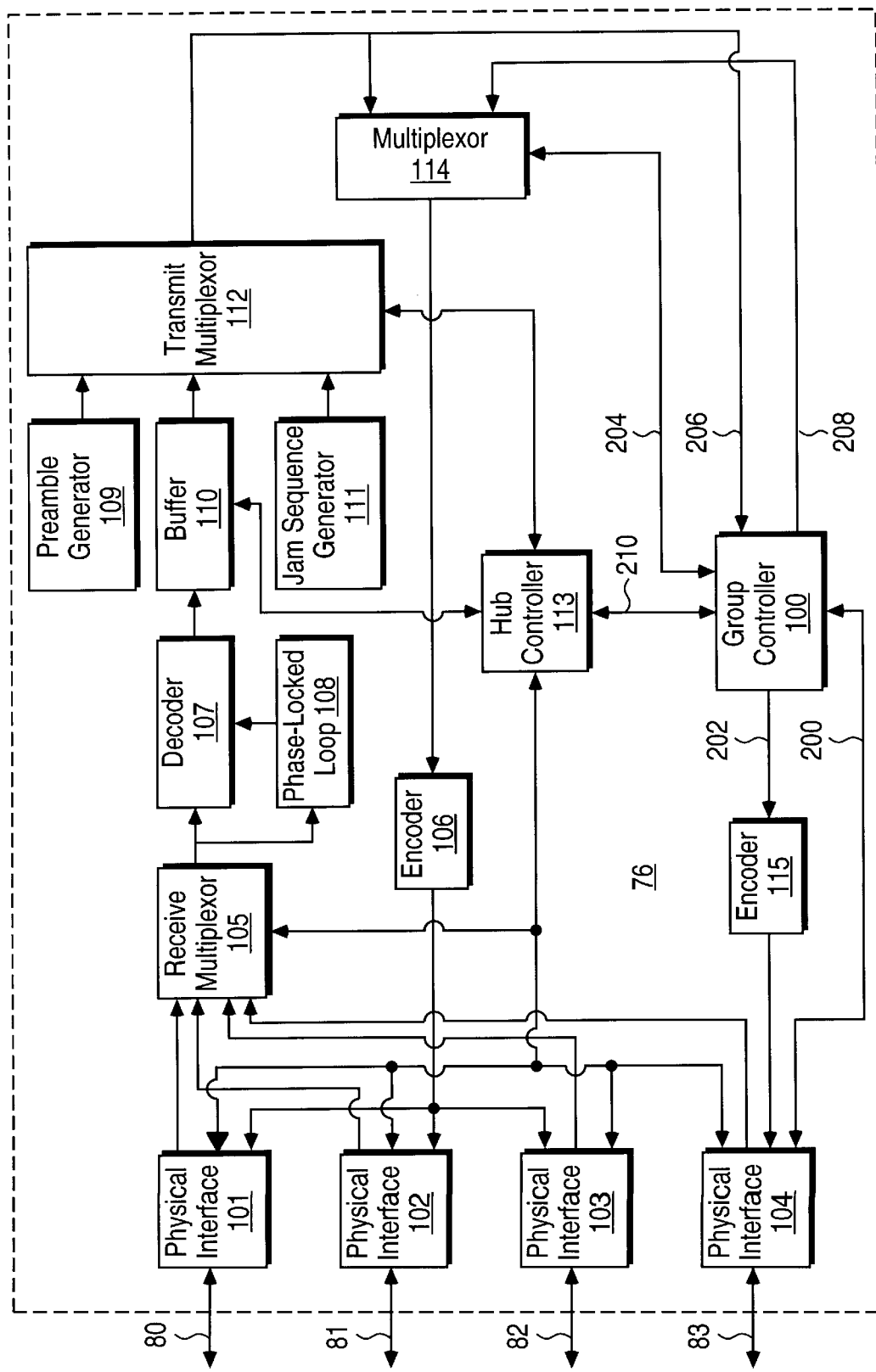
FIG. 2 shows one embodiment of a group hub according to the present teachings.

FIG. 2 shows one embodiment of the group hub 76. The group hubs 70–74 may be implemented in a similar manner. The group hub 76 includes a set of physical interfaces 101–103 which enable communication with the nodes 50–52. The physical interfaces 101–103 are the bottom ports of the group hub 76. A physical interface 104 enables communication with the group hub 74. The physical interface 104 is the top port of the group hub 76.

The group hub 76 includes a receive multiplexor 105 that selects the receive lines from the physical interfaces 101–104 for input to a decoder 107 and phase-locked loop 108. A resulting reconstructed data stream is fed into a buffer 110 which is a FIFO. A hub controller 113 uses a transmit multiplexor 112 to select the output of the buffer 110 or a preamble generator 109 or a jam sequence generator 111 for return to an encoder 106 which drives selected ones of the physical interfaces 101–103.

The elements of the group hub 76 that distinguish it as a group hub rather than a conventional hub such as the hubs 60–64 include a group controller 100, a multiplexor 114, an encoder 115, and the physical interface 104. The transmit signal to the top port is provided through the multiplexor 114 under control of the group controller 100. The transmit signal to the bottom ports also pass through the multiplexor 114 under control of the group controller 100.

The group controller 100 receives a selected input signal 206 from the bottom ports and the top port via the multiplexor 114 and the transmit multiplexor 112. If the group controller 100 detects a message of the type of predetermined message described above, then it modifies the "mark" bit in the destination address as described above. The group controller 100 may also re-compute and insert a revised CRC or make other modifications to the message content. Such modification may be different depending on whether the message is being re-transmitted on the top port or one of the bottom ports.

Figure 3:
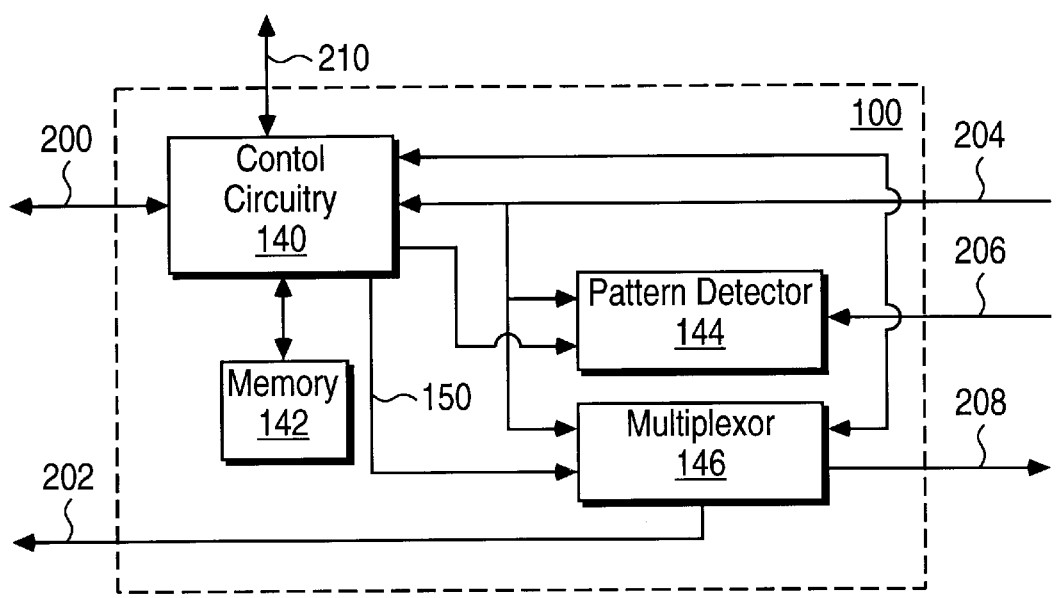
FIG. 3 shows one embodiment of the group controller in a group hub.

FIG. 3 shows one embodiment of the group controller 100. The group controller 100 includes a set of control circuitry 140 that receives signals via a data path 200 and a data path 210 that indicate whether the active receive port is the top port or one of the bottom ports. The control circuitry 140 uses the signals on the lines 200 and 210 along with a signal on a data path 204 from a pattern detector 144 to control the multiplexor 114 and a multiplexor 146 in the group controller 100 so as to send the correct transmit signals to either the top or bottom ports. In addition, the control circuitry 140 is capable of modifying selected bits for marking or CRC changes via the multiplexor 146 and a signal on a line 150.

The pattern detector 144 is provided with patterns and locations of patterns that are to be searched for in an incoming bit stream received via the line 206. The patterns and/or their locations within the incoming bit stream my be "hard-wired" or may be programmable or downloadable via the lines 204 from the control circuitry 140. The control circuitry 140 can compute and/or retrieve this information from a memory 142. The pattern detection performed by the pattern detector 144 is a bit wise comparison of the reference patterns with the incoming data stream. The control circuitry 140 also generates and transfers to the multiplexor 146 the appropriate CRCs for outgoing messages. The multiplexor 146 can direct either the incoming stream on the line 206 or the signals on a line 150 on a bit by bit basis independently to a bottom port via the lines 208 or the top port via the lines 202. The control circuitry 140 may be implemented with a microprocessor with possible hardware assist for generating bit sequences for message modification. The microprocessor may participate in other aspects of the group identity protocol such as sending follow-up message, computation of domain to multi-cast addressing, and computation of characterization numbers.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed system, comprising:

a set of nodes;

a set of group hubs that enable communication among the nodes wherein a topology of connections among the group hubs and the nodes defines a hierarchy, the group nodes and the group hubs engaging in an exchange of messages using a group identification protocol for determining a set of groupings of the nodes in the hierarchy such that the groupings enable the nodes to determine a set of addresses for the groups for use in an application in the distributed system.

2. The distributed system of claim 1, wherein the addresses are a set of multi-cast addresses in the distributed system.

3. The distributed system of claim 2, wherein the nodes determine the addresses by mapping a set of application-specific communication domains in the distributed system onto the multi-cast addresses.

4. The distributed system of claim 1, wherein the group identification protocol includes a group query message which is used by the nodes and group hubs to obtain a set of identifiers for the groupings from the group hubs.

5. The distributed system of claim 4, wherein each node and group hub periodically generates and transmits the group query message.

6. The distributed system of claim 4, wherein each node and group hub generates and transmits the group query message at power up.

7. The distributed system of claim 4, wherein each node and group hub generates and transmits the group query message in response to a global message which is broadcast in the distributed system.

8. The distributed system of claim 4, wherein each group hub blocks transmission of the group query message to a higher level of the distributed system.

9. A distributed system, comprising:

a set of nodes;

a set of group hubs that enable communication among the nodes wherein the group hubs and the nodes engage in a group identification protocol for determining a set of groupings of the nodes which are based on a topology of connections among the group hubs and the nodes, the group identification protocol including a group query message which is used by the nodes and group hubs to obtain a set of identifiers for the groupings from the group hubs, each group hub blocking transmission of the group query message to a higher level of the distributed system by modifying the group query message such that the nodes and the group hubs reached via the higher level ignore the group query message.

10. The distributed system of claim 4, wherein the group hubs each generate a group identification message that includes a corresponding identifier for the group hub in response to the group query message.

11. The distributed system of claim 10, wherein the group identification message includes a set of identifiers that specify a hierarchical arrangement of the group hubs.

12. A distributed system, comprising:

a set of nodes;

a set of group hubs that enable communication among the nodes wherein the group hubs and the nodes engage in a group identification protocol for determining a set of groupings of the nodes which are based on a topology of connections among the group hubs and the nodes, the group identification protocol including a group query message which is used by the nodes and group hubs to obtain a set of identifiers for the groupings from the group hubs wherein the group hubs each generate a group identification message that includes a corresponding identifier for the group hub in response to the group query message, the group identification message including a set of identifiers that specify a hierarchical arrangement of the group hubs wherein each node determines a characterization number in response to the identifiers that specify the hierarchical arrangement.

13. The distributed system of claim 12, wherein the nodes determine a set of addresses associated with the nodes by mapping a set of application-specific communication domains in the distributed system onto the multi-cast addresses in response to the characterization numbers.

14. The distributed system of claim 10, wherein each group hub blocks transmission of a group identification message received from a higher level of the distributed system to a lower level of the distributed system.

15. A distributed system, comprising:

a set of nodes;

a set of group hubs that enable communication among the nodes wherein the group hubs and the nodes engage in a group identification protocol for determining a set of groupings of the nodes which are based on a topology of connections among the group hubs and the nodes, the group identification protocol including a group query message which is used by the nodes and group hubs to obtain a set of identifiers for the groupings from the group hubs wherein the group hubs each generate a group identification message that includes a corresponding identifier for the group hub in response to the group query message, each group hub blocking transmission of a group identification message received from a higher level of the distributed system to a lower level of the distributed system by modifying the group identification message such that the nodes and the group hubs reached via the lower level ignore the group identification message.

* * * * *